United States Patent Office 3,492,071
Patented Jan. 27, 1970

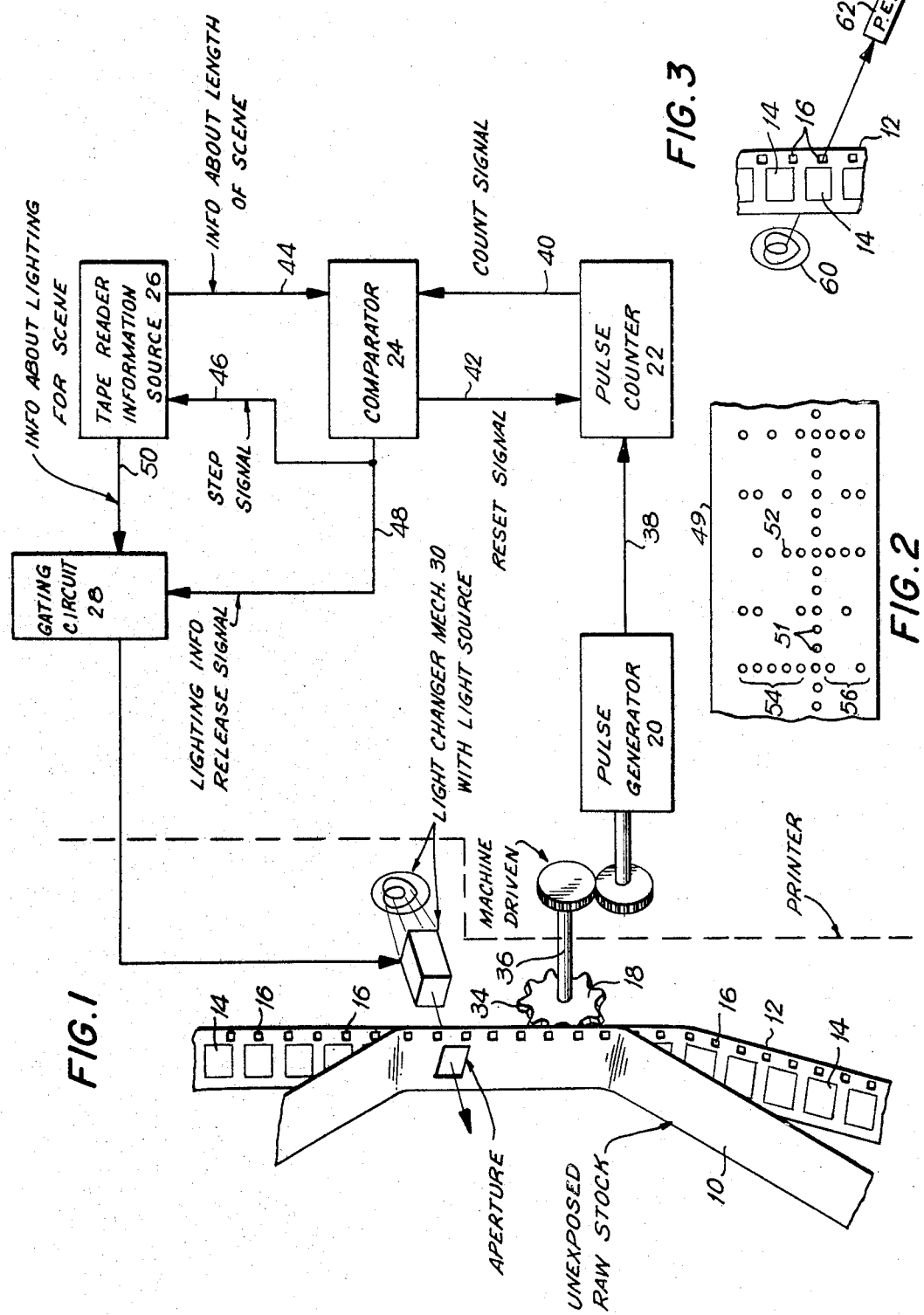

3,492,071
APPARATUS AND METHOD FOR PRINTING FROM PRE-PRINT FILM
Gus Limnios, 42—28 166th St., Flushing, N.Y. 11358, and Saul Jeffee, Scarsdale, N.Y. (619 W. 54th St., New York, N.Y. 10019)
Filed Mar. 23, 1967, Ser. No. 625,339
Int. Cl. G03b 27/78
U.S. Cl. 355—83             7 Claims

ABSTRACT OF THE DISCLOSURE

An apparatus for printing on rawstock from a length of pre-print film constituted by a series of scenes, each having a preferred printing light level. A source of information, such as a paper tape, is provided to carry information which identifies the length of each scene on the pre-print film and the preferred printing light level for each scene. The apparatus further includes a signal generating component which operates in combination with a film transport device to generate signals for determining the amount of film transported through the exposure device. Also, a control component is coupled to a scene detecting device and to the source of information for using the information upon a change in scene to control the printing light source by selecting the preferred printing light level for the next sequential scene.

---

This invention relates to apparatu sand methods for printing on rawstock from pre-print film and more particularly to improvements in techniques involving the control of lighting and for color in the printing or rawstock.

The production of motion picture films usually involves the photographing of a series of scenes on a negative or positive film which is thereafter employed in printing a multiplicity of positive films or the like. The negative or positive film which is used for the printing is known as "pre-print film" and the material on which the printing is to be effected is known as "rawstock".

The aforementioned scenes may be photographed at different locations and under different lighting conditions and consequently the different scenes on the pre-print film may require different optimum printing light levels and color balance when the pre-print film is employed for producing prints on rawstock.

The simplest method of adjusting the printing light and/or color levels during printing by the use of pre-print film is by actually inspecting the pre-print film and manually adjusting the printing light or color level in accordance with the determination made as a result of the visual inspection. This technique is, however, time consuming and therefore economically unsound.

There has accordingly been developed a more sophisticated method in accordance with which the pre-print film is inspected initially and is provided with markings indicating the end of one scene and the beginning of the next scene at which transition point the lighting and/or color may be adjusted in accordance with this single initial inspection of the pre-print film the results of which inspection are recorded in various ways and employed to control automatically the adjustment of printing light level and/or color correction.

Some of the various techniques employed in respect of pre-print film to indicate the transition point between one scene and another involve the punching of notches into the edge of the pre-print film or attaching thereto of metallic cues or clips or the like which are readily detectable and which can be employed to actuate an automatic control whereby printing light or color level is adjusted to the optimum for the newly arriving scene.

Such placing of cues or notches on a pre-print film is both costly and time consuming and in certain instances operates to weaken the film or otherwise contribute to lessening the value thereof. Moreover, the customary placing of notches and cues on the edges of films also causes failures because of film shrinkage. It is accordingly an object of the invention to provide improved techniques and apparatus for printing on rawstock from pre-print films inclusive of a printing light level and/or color adjustment technique which does not depend upon the placing of cues on the pre-print film.

In achieving the above and other of its objectives, the method of the invention comprises preparing a record of scene lengths relative to the pre-print film and of a preferred printing light level and/or color correction relative to each sense. The scene lengths are recorded in respect of the number of frames or the equivalent thereof in each particular scene and the rawstock is exposed to the pre-print film in a zone of exposure with a controlled printing light level or color correction. In accordance with the invention as the pre-print film is driven through the printer, pulses are generated numerically corresponding to the number of frames driven through the zone of exposure or printing. These pulses are counted and the thusly prepared count is compared with the record of scene lengths to determine the end of one scene and the beginning of the next scene. The light printing level and/or color correction are adjusted in accordance with the aforesaid record of optical correction between each scene, the two records being made available on the same record medium. It is to be noted that the pulses are preferably generated independently of any information contained on the pre-print film.

The apparatus of the invention comprises printing means for exposing the rawstock to the pre-print film, the printing means including a controllable printing light and/or color correction to adjust the strength of the exposure. A source of information relating to the pre-print film is provided, the information identifying as noted above the length of each scene on the pre-print film and the printing light strength or exposure level for each scene. A film transport means is provided to transport the pre-print film to the printing means and a signal generating means is provided which is responsive to the film transport means to generate signals from which can be determined the amount of film transported to the printing means. In addition there is provided a scene detecting means coupled to the source of information and to the signal generating means to determine the completion of one scene and the beginning of the next. A control means is then used which is coupled to the scene detecting means and to the source of information and which utilizes the information upon a change in scene to control the printing light source to select the preferred printing light level for the next scene.

As a feature of the invention the source of information, as will be shown, includes a tape having two zones of information respectively related to scene length and to scene pre-print film exposure and/or color correction.

In accordance with yet another feature of the invention, the film transport means includes a rotatable sprocket and said signal generating means includes means mechanically coupled to and driven by the sprocket for purposes of generating pulses. The design is such that it can run in either direction, forward or reverse, and controls the preferred printing light level and/or color correction exactly at the scene change.

Still further, the invention contemplates that the scene detection means may comprise a counter to count the pulses and a comparator to compare the thusly resulting count against scene lengths.

In accordance with still another feature of the invention, gating means are employed by the apparatus of the invention, the source of information being coupled to the comparator means for a stepping of the aforesaid tape and to the gating means for the supply of scene lighting information thereto. The gating means is coupled to the comparator for control thereby.

The above objects and features of the invention will become more apparent from the following detailed description of a preferred embodiment thereof, as illustrated in the accompanying drawing, in which:

FIGURE 1 is a block diagram diagrammatically illustrating an apparatus for effecting the techniques of the invention;

FIGURE 2 illustrates a portion of a tape record medium upon which information relating to scene length and preferred lighting level is recorded; and FIGURE 3 diagrammatically illustrates a modification.

The apparatus illustrated in the drawing is intended to provide for the printing of a motion picture on rawstock 10 by the use of a pre-print film 12, the latter comprising a series of frames 14 and being provided with a series of lateral sprocket holes 16 in usual manner. Both of these films are well known and of conventional type and the general technique of printing on rawstock from the pre-print film requires no explanation in this text.

The apparatus for processing these films in accordance with the preferred techniques of this invention comprises a film transport means 18, a pulse generator 20, a pulse counter 22, a comparator 24, a tape information source 26, a gating circuit 28, a printing light control 30 providing a controllable printing light level. It should be noted that while reference is made to a printing light control and light level, this is intended to cover color correction or other optical adjustments as may be necessary.

The transport means 18 is illustrated in the form of a rotatable sprocket wheel having a plurality of peripheral teeth 34 intended to engage in sprocket holes 16 provided at one edge of the negative film 12. The means for driving such sprocket wheels are well known and not within the scope of the instant invention. Said wheel is mechanically coupled such as by a shaft 36 to the pulse generator 20 so that a mechanical coupling exists between the film transport and the signal generating means 20.

The pulse generator 20 may be of various known types such as, for example, direct contact type, magnetic type, electrostatic type, and so forth. By way of example a magnetic drum may be employed such as that described in Pat. 2,902,675, which issued to R. Shaw et al. on Sept. 1, 1959 (particular reference being made to FIG. 22). Such magnetic drums are well known for purposes of generating equally spaced pulses upon being driven by an associated rotating mechanism.

Accordingly, it is possible to generate a series of pulses in the generator 20 corresponding to rotation of sprocket wheel 18 and therefore corresponding to the number of frames 14 which will be driven past a given point (for example, the point zone of exposure of the rawstock 10 to the pre-print film 12) in accordance with which the number of pulses generated by generator 20 will be an exact indication of the number of frames as aforesaid.

Pulse generator 20 is coupled via a line 38 to the pulse counter 22. The pulse counter 22 may be, for example, of either decimal or binary type and may be provided with or without display means, although the use of a display means is preferred for purposes of monitoring. Suitable pulse counters are described in pages 12-31 of Highspeed Computing Devices by the Staff of Engineering Research Associates, Inc., McGraw-Hill Book Company, 1950 (see, for example, FIGS. 3-4, page 18).

The purpose of the pulse counter 22 is to count and represent in intelligible form the number of pulses generated by generator 22 throughout the passage of a single scene.

The pulse counter 22 is coupled to the comparator 24 by means of a line 40 and by means of a second line 42. The pulse counter 22, transmits the count signal via line 40 to the comparator 24 and receives a reset signal via the line 42 from the comparator 24 at a particular time, as will be hereinafter indicated in greater detail. Alternatively, the reset signal can be omitted and the count can be reversed such as to end at zero.

The function of the comparator 24 is to compare the count generated in the counter 22 with a second signal. This second signal is provided by the tape information source 26 which is connected to the comparator 24 by means of a line 44 as well as by means of a line 46.

The tape information source 26 may be a conventional paper tape or magnetic tape record such as, for example, appears in the aforesaid Pat. 2,902,675 (particular reference being made by way of example to FIG. 44). The tape information source 26 may alternatively comprise a punched paper tape as shown by way of example in FIG. 2.

In FIG. 2 the paper tape 49 is provided with a series of sprocket holes 51 and a multitude of information holes 52. The information holes 52 are divided into groups 54 and 56, the group 54, for example, providing information in respect of the length or footage of each film scene, while the group 56 provides information in respect of preferred lighting level for a particular scene.

More particularly, each sprocket hole 51 corresponds with a given scene. As the information source 26 is stepped from scene to scene, the respective groups 54 and 56 of information holes will be inspected. In well known binary techniques, these information holes provide coded groups which may be used to identify related information and the information relating to the groups 54 and 56 is, as aforesaid, related to exposure (such as lighting level) and scene length.

In any event, the information relating to scene length is transmitted from source 26 via line 44 to the comparator 24. This information is held in the comparator 24 for comparison with the continually increasing count transmitted from counter 22 via line 44. When identity is detected between information received via line 44 and information received via line 40, the comparator 24 transmits a signal. This signal is transmitted along line 46 as aforesaid, to information source 26 and is furthermore at the same time transmitted via line 48 to gating circuit 28 to operate as will next be explained.

Information relating to printing light level and/or color correction is transmitted from information source 26 via line 50 to gating circuit 28. The information is blocked by the gating circuit 28 and cannot proceed through to the control 30. When coincidence is detected, as noted above, by comparator 24, the signal appearing on line 48 opens the gating circuit 28 and releases the information from source 26 so that it can proceed through to the control 30. At the same time, the step signal on line 46 causes the tape 49 in information source 26 to be stepped to the next sequential sprocket preparatory to the use of the next sequential scene information.

In the meantime the gating circuit 28 which, for example, can be one of the gating circuits described on pages 32-35 of Highspeed Computing Devices supra, passes to the printing light control 30. The printing light control 30 may be operated in either digital or analog fashion and printing light controls responding to electrical information signals are well known in the art and require no further amplification in this text. This printing light control 30 corresponds to the information provided by information source 26 to provide the necessary lighting to provide an optimum transferral of the images from frames 14 to the raw stock 10.

From what has been stated above, it will appear that the method of the invention involves the preliminary preparing of a record of scene lengths relative to the pre-print film and of preferred lighting levels relative to each scene. This preparation is initially undertaken by a detailed inspection of the pre-print film involved, each scene length and corresponding desired lighting level being recorded on a paper or magnetic tape or the like which will be employed in the information source 26.

With the tape loaded in the information source 26, the negative film is then driven through the exposure zone and pulses are generated numerically corresponding to the number of frames driven to the zone of exposure in the printer 32. These pulses are counted and the count is compared with the record of scene lengths to determine the transition point between the end of one scene and the beginning of the next scene. The printing light level is adjusted in accordance with the record of preferred lighting level which is found on the tape in correspondence with the identification of the transition point.

Various modifications are possible. In FIG. 3, for example, pulse generator 20 is replaced by a light source 60 and a photoelectric cell 62 which functions to count sprocket holes 16 and transmit pulses via line 64 to the pulse counter 22 of FIG. 2.

There will now be obvious to those skilled in the art many modifications and variations of the structures and techniques set forth hereinabove. These modifications and variations will not depart from the scope of the invention if defined by the following claims.

What is claimed is:

1. Apparatus for printing on rawstock from a length of pre-print film constituted by a series of scenes each having a preferred printing light level, said apparatus comprising means for exposing the rawstock to the pre-print film and including a controllable printing light source ti adjust the strength of exposure, a source of information relating to said pre-print film, said information identifying the length of each scene on the pre-print film and the preferred printing light level for each scene, film transport means to transport the pre-print film through the first said means, signal generating means responsive to said film transport means to generate signals from which can be determined the amount of film transported through the first said means, scene detecting means coupled to said source of information and to said signal generating means to determine the completion of a scene and the beginning of the next scene, and control means coupled to said scene detecting means and to said source of information and utilizing said information upon a change in scene to control said printing light source to select the preferred printing light level for the next scene and to effect the latter said level for the length of the latter said scene.

2. Apparatus as claimed in claim 1, wherein said source of information includes a tape having two zones of information respectively related to scene length and scene lighting.

3. Apparatus as claimed in claim 2, wherein said film transport means includes a rotatable sprocket and said signal generating means includes means mechanically coupled to and driven by said sprocket to generate pulses.

4. Apparatus as claimed in claim 3, wherein said scene detection means comprises counter means to count said pulses and comparator means to compare the thusly resulting count against scene length.

5. Apparatus as claimed in claim 4 comprising gating means and wherein said source of information is coupled to said comparator means for a stepping of the tape and to said gating means for the supply of scene lighting information thereto, said gating means being coupled to said comparator means for control thereby.

6. A method of printing on rawstock from a pre-print-film comprising preparing a record of scene lengths relative to the pre-print film and of preferred printing light level relative to each scene, the scene lengths being recorded in respect of number of frames, and exposing the rawstock in a zone of exposure to the pre-print film with a controlled printing light level, the pre-print film being driven at a rate which is used to generate pulses numerically corresponding to the number of frames driven through the zone of exposure, counting said pulses and comparing the count with the record of scene lengths to determine the end of one scene and the beginning of the next scene, and adjusting printing light level in accordance with the record of preferred light level at the beginning of each scene.

7. A method as claimed in claim 6, wherein said pulses are generated independently of any information on said pre-print film.

References Cited

UNITED STATES PATENTS

| | | | |
|---|---|---|---|
| 2,851,676 | 9/1958 | Woodcock et al. | |
| 2,943,554 | 7/1960 | Kästner | 95—75 |
| 3,374,723 | 3/1968 | Baumbach | 95—75 |

NORTON ANSHER, Primary Examiner

R. L. MOSES, Assistant Examiner

U.S. Cl. X.R.

355—69, 103